United States Patent

Van Der Houwen

[15] 3,701,947

[45] Oct. 31, 1972

[54] METHOD OF MAKING A DECISION ON THE VALUE OF A PULSATORY SIGNAL AND DEVICE FOR CARRYING OUT THIS METHOD

[72] Inventor: Derk Van Der Houwen, Leidschendam, Netherlands

[73] Assignee: U.S. Phillips Corporation, New York, N.Y.

[22] Filed: Jan. 22, 1971

[21] Appl. No.: 108,801

[30] Foreign Application Priority Data

Jan. 23, 1970 Netherlands..............7000945

[52] U.S. Cl. ......................325/321, 325/41, 325/44, 325/159, 325/324, 328/153, 328/163

[51] Int. Cl. ..............................................H04b 1/10

[58] Field of Search ..........325/38 B, 41, 42, 44, 159, 325/321, 323, 324, 473, 474; 328/48, 147, 153, 162, 163

[56] References Cited

UNITED STATES PATENTS

| | | | |
|---|---|---|---|
| 3,611,149 | 10/1971 | Kimball | 325/323 |
| 3,214,700 | 10/1965 | Hook | 325/323 |
| 3,614,626 | 10/1971 | Dillard | 325/323 |
| 3,497,817 | 2/1970 | Ellis | 328/163 |
| 3,526,837 | 9/1970 | Zegers et al. | 325/41 |

*Primary Examiner*—Richard Murray
*Assistant Examiner*—Peter M. Pecori
*Attorney*—Frank R. Trifari

[57] ABSTRACT

A decision arrangement for deciding the value of pulsatory signals occurring in a synchronous baseband transmission system comprises a first decision circuit with quantized feedback for providing a variable decision threshold. Possible instabilities of the first decision circuit as a result of the quantized feedback are corrected by providing a second decision circuit with a fixed decision threshold and by coupling both decision circuits to a decision comparator controlling a switch so as to connect either the first decision circuit or the second decision circuit to the output of the decision arrangement in accordance with a predetermined program of the decision comparator.

3 Claims, 2 Drawing Figures

METHOD OF MAKING A DECISION ON THE VALUE OF A PULSATORY SIGNAL AND DEVICE FOR CARRYING OUT THIS METHOD

The invention relates to a method of making a decision by means of threshold comparison on the value of a pulsatory signal which occurs in a synchronous baseband transmission system, in which the threshold is variable due to the application of a quantized feedback loop. Furthermore the invention relates to a device for carrying out this method.

Such a method is known from the book Data Transmission by Bennett and Davey (1965) p.274. In view of the problem posed, the quantized feedback is realized in this case by providing a filter in the feedback loop, which filter compensates the response of a lowpass filter included in the transmission channel. The embodiment appears to have a drawback in that the quantized feedback must take place as long as the pulse response of the filter in the feedback loop continues. In such circumstances, the predictable intersymbol interference is avoided, but an inconvenient possibility of instability is introduced.

An object of the present invention is to correct this instability with a minimal affect on from the optimum suppression of intersymbol interference.

According to the invention, the method is characterized in that first an inequality for the decision relative to a decision on the value of the same signal at a fixed threshold during the decay-time of the pulse response of the filter in the feedback loop is found and then the decision on the fixed threshold is passed on as the correct one.

In order that the invention may be readily carried into effect, some embodiments thereof will now be described in detail, by way of example, with reference to the accompanying diagrammatic drawing in which.

Figure 1:
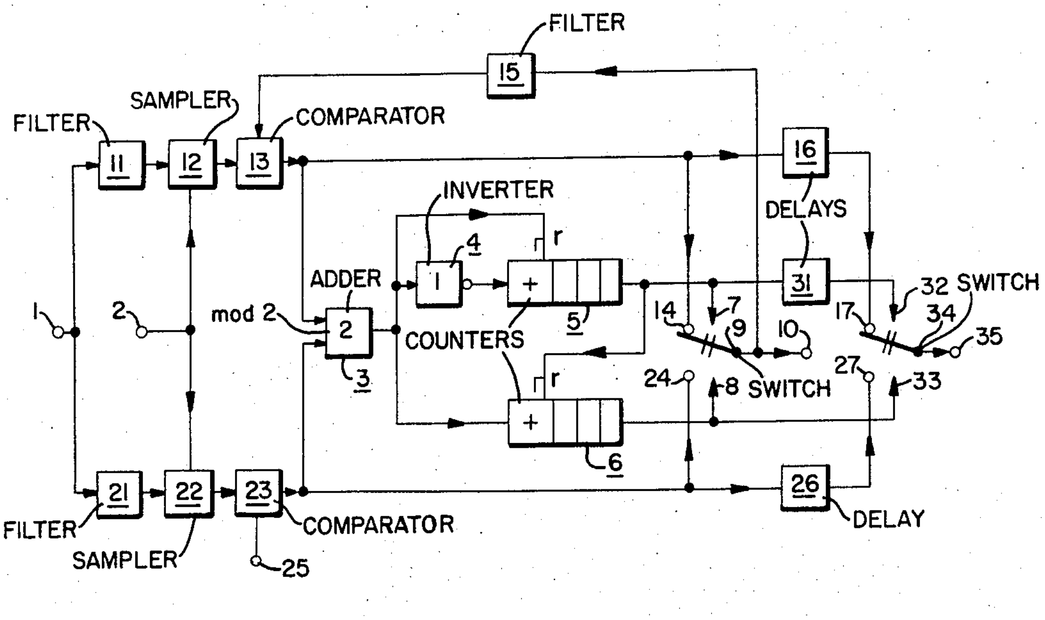
FIG. 1 shows a block diagram of the device according to the invention.

In FIG. 1, the device for carrying out the method according to the invention includes a member for the coherent control of a first output for decisions on the variable threshold and a second output for decisions on the fixed threshold. This member comprises a modulo-2-adder 3, an inverter 4, a counter 5 having an output to point 7, a counter 6 having an output at point 8 and a switch 9 for connecting outputs 14 and 24 to an output 10, said switch a being controlled by outputs 7 and 8, respectively. The signal condition at output 14 is determined by a circuit connected to an input 1 and consisting of the cascade of a linear filter 11, a sampler 12, which is fed with pulses at instants $t_1+m$T through an input 2, and a comparison circuit 13 to which comparison circuit the signal condition at output 10 is transferred as a threshold value through a filter 15 having a pulse response $s(t)$. The signal condition at output 24 is determined by a circuit connected to input 1 and consisting of the cascade of a linear filter 21, a sampler 22, which is fed with pulses at instants $t_1 + m$T through input 2, and a comparison circuit 23, to which a constant signal from point 25 is applied as a fixed threshold value.

Counter 5 counts a number $q$ of successive equal and simultaneous decisions. When the number $q$ is reached, a value "1" is supplied to output 7 and to a reset input $r$ of counter 6.

Counter 5 is reset when a value "1" appears at the output of modulo-2-adder 3. The number of signal conditions "1" at the output of modulo-2-adder 3 is counted in counter 6. When the number $n$ of the unequal simultaneous decisions is reached a signal condition "1" is applied to output 8.

An output 17 is connected through a delay network 16 having a delay $\tau_1$ to output 14. Likewise, an output 27 is connected to output 24 through a delay network 26 also having a delay $\tau_1$.

Outputs 32 and 33 convey the same signal condition as outputs 7 and 8, respectively, on the understanding that output 32 conveys the delayed signal condition of output 7 as a result of the insertion of a delay network 31 having a delay $\tau_2$. A switch 34 may connect outputs 17 and 27 to output 35 under the control of outputs 32 and 33, respectively.

The device operates in such a manner that after application of at least $q$ equal simultaneous decisions to modulo-2-adder 3, switches 9 and 34 occupy the respective positions in which outputs 10 and 35 convey the decisions of comparison circuit 13, switch 9 occupying its position instantaneously and switch 34 occupying its position delayed by $\tau_1$. As soon as an inequality of the decisions in comparison circuits 13 and 23 is apparent, a signal condition "1" appears at the output of modulo-2-adder 3 and counter 5 is reset while counter 6 counts an inequality. After counter 6 has counted $n$ inequalities, switches 9 and 34 are set in positions in which the decisions of comparison circuit 23 appear at outputs 10 and 35, respectively.

The setting of switches 9 and 34 may be prevented in that counter 5 counts $q$ equal decisions sooner than counter 6 counts $n$ unequal decisions. Since the circuit is arranged for simultaneously controlling both switches after a certain member $n$ of periods T, erroneous decisions may appear at output 10. By suitable choice of $\tau_1$ and $\tau_2$ it may be prevented that erroneous decisions are presented to output 35.

Figure 2:
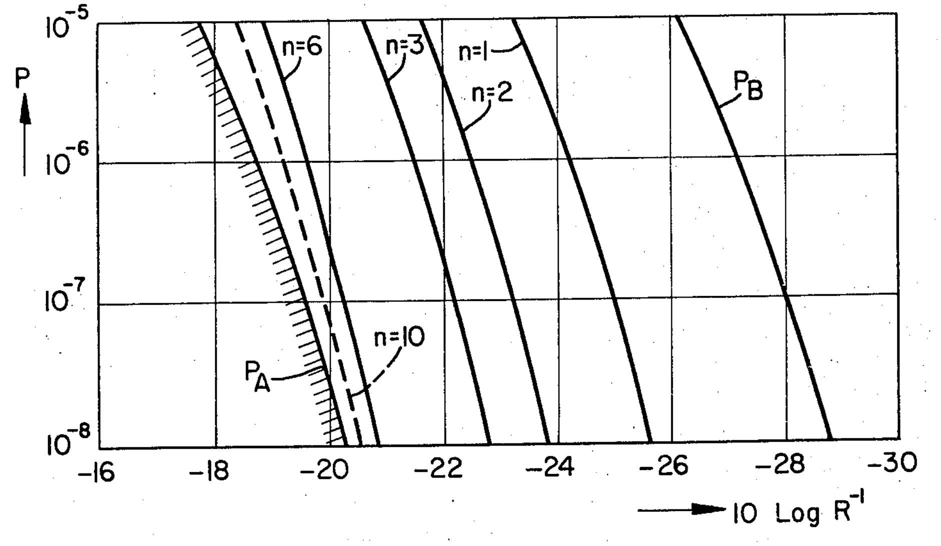
FIG. 2 is a graphic representation of the effect to be expected of the invention on the error probability P in the decisions in a certain transmission system under the influence of a noise source having a noise power R.

Assume an input from a transmission system, in which the pulse response $s(t)$ of filter 15 renders an elimination of the predictable intersymbol interference possible and in which $s(t) = 0$ if $t \geq (q+1)T$, $P_A$ represents the error probability of the method employing exclusively the variable threshold value (outputs 14 and 17) and $P_B$ represent the error probability of the method employing exclusively the fixed threshold value (outputs 24 and 27) if the erroneous decisions are independent of each other. For a coaxial cable transmission system employing the method of the invention, FIG. 2 shows that for $n = 1$ an error probability of $10^{-6}$ is reached at a value of the added noise R which is 3 dB higher than for the fixed threshold case. When $n = 6$, the gain is 7.7 dB. In the device for carrying out the method and including the delay networks 16, 26 and 31 a gain of 8.1 dB may be reached for $n = 10$ (broken line) and a distance to $P_A$ of 0.4 dB. This gain is important in that it provides the possibility of including pulse repeaters in transmission lines at larger intervals than is possible with a pulse repeater of the fixed threshold type without increasing the error probability.

What is claimed is:

1. An arrangement for making decisions on the value of a pulsatory signal occurring in a synchronous baseband transmission system, said arrangement comprising a first decision circuit, said first decision circuit including a first comparator, means to couple said pulsatory signal to said first comparator and means to produce a variable threshold signal, said first decision circuit providing an output representative of the difference between said pulsatory signal and said variable threshold signal, a second decision circuit, said second decision circuit including a second comparator, means to couple said pulsatory signal to said second comparator, and means to produce a fixed threshold signal, said second decision circuit providing an output signal representative of the difference between said pulsatory signal and said fixed threshold signal, switching means for applying one of the output signals of said first and said second decision circuits to an output terminal of said arrangement, said means to produce a variable threshold signal comprising a filter coupled to said output terminal, and means to compare said first and said second decision circuit output signals, said comparing means producing a control signal indicating a predetermined number of differences between said first and said second decision circuit output signals within a predetermined time interval and controlling said switching means to apply said second decision circuit output signal to said output terminal during a time interval corresponding to the decay time of the impulse response of said filter.

2. An arrangement as claimed in claim 1, wherein said means for comparing said first and said second decision circuit output signals comprises means for providing a first indication pulse in response to each equal and simultaneous first and second decision circuit output signals and a second indication pulse in response to each unequal and simultaneous first and second decision circuit output signals, a first resettable counter coupled to count not more than $q$ of the successive first indication pulses and to provide a first control signal when reaching its $q$ count position, means for resetting said first counter to its reference count position in response to each second indication pulse, a second resettable counter coupled to count not more than $n$ of the second indication pulses and to provide a second control signal when reaching its $n$ count position, means for resetting said second counter to its reference count position in response to said first control signal, said first control signal controlling said switching means so as to apply said first decision circuit output signal to said output terminal, said second control signal controlling said switching means so as to apply said second decision circuit output signal to said output terminal.

3. An arrangement as claimed in claim 2, further comprising first and second delay means coupled to provide equally delayed replicas of said first and said second decision circuit output signals, additional switching means for applying one of the delayed replicas of said first and said second decision circuit output signals to an additional output terminal of said arrangement, third delay means coupled to provide a delayed replica of said first control signal for controlling said additional switching means in order to apply the delayed version of said first decision circuit output signal to said additional output terminal, and means coupled to provide an undelayed replica of said second control voltage for controlling said additional switching means in order to apply the delayed version of said second decision circuit output signal to said additional output terminal.

* * * * *